H. MONROE.
TIDE MOTOR.
APPLICATION FILED SEPT. 12, 1914.

1,142,724.

Patented June 8, 1915.
2 SHEETS—SHEET 1.

Witnesses
Paul M. Hunt
Wm. S. Fowler

Inventor
Henry Monroe
By
Attorney

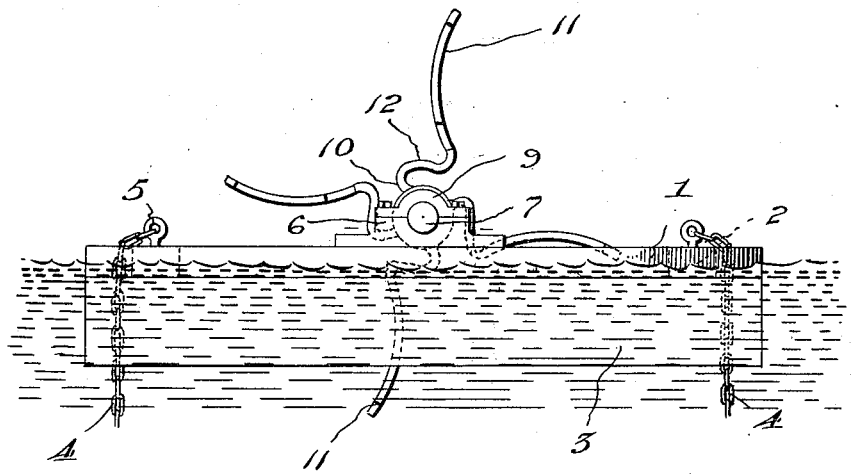
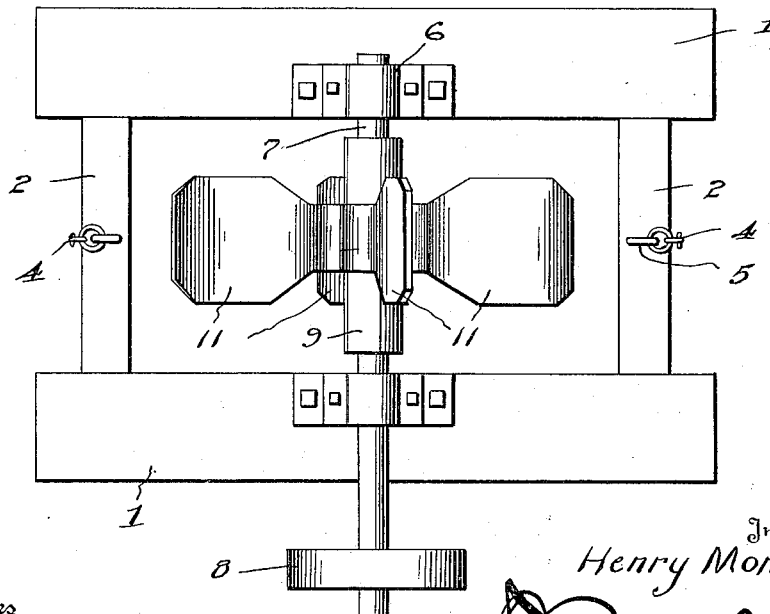

UNITED STATES PATENT OFFICE.

HENRY MONROE, OF SABETHA, KANSAS.

TIDE-MOTOR.

1,142,724. Specification of Letters Patent. Patented June 8, 1915.

Application filed September 12, 1914. Serial No. 861,424.

*To all whom it may concern:*

Be it known that I, HENRY MONROE, a citizen of the United States, residing at Sabetha, in the county of Nemaha and State of Kansas, have invented certain new and useful Improvements in Tide-Motors; and I do hereby declare the following to be a full, clear, and exact description of the invention, such as will enable others skilled in the art to which it appertains to make and use the same.

This invention comprehends certain new and useful improvements in tide motors and has for its primary object to provide a motor of this character which will be of simple construction and operation as well as highly efficient in use and which may be readily anchored in a stream and which will include a float frame upon which is mounted a shaft provided with a wheel having improved and novel form of blades, whereby the current will engage the blades and rotate the wheel and shaft to create the motive power.

The invention has for another object to provide a tide motor of this character which will be of such form that the blades may be readily and cheaply manufactured and secured to the hub of the wheel in such manner that there will be more or less resiliency to the blades during the operation of the device.

The invention has for a further object to provide a tide motor of this character which will be of such construction that the blades of the motor wheel may be formed of resilient material and be reversely curved at their inner ends before being secured to the hub of the wheel, thereby increasing the strength of the blades and diminishing the liability of the blades breaking under the strain to which they are subjected.

The invention has for a still further object to provide a motor of this character which will be of extremely simple construction and operation as well as durable and highly efficient in use and cheap to manufacture.

With the above and other objects in view as will become more apparent as the description proceeds, the invention consists in certain novel features of construction, combination and arrangement of parts as will be hereinafter more fully described and claimed.

Figure 1:
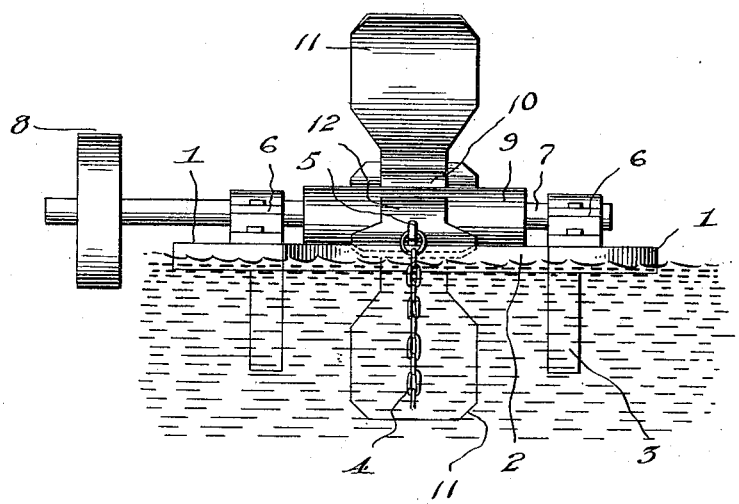
Figure 4:
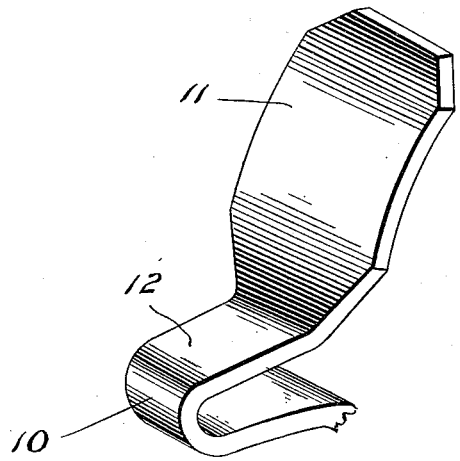

For a complete understanding of my invention, reference is to be had to the following description and accompanying drawings, in which, Figure 1 is an end elevation of the device in use, Fig. 2 is a side elevation thereof, Fig. 3 is a top plan view of the motor, and Fig. 4 is an enlarged detail perspective view of one of the blades removed.

Referring more particularly to the drawings in which similar reference characters designate corresponding parts throughout the several views, 1 designates the longitudinal horizontal members of the float frame connected by the transverse frame members 2 and from the inner longitudinal edges of which depend the vertical longitudinal frame members 3 of the float frame which may be readily anchored in a stream by suitable weights or anchors, (not shown) attached to the lower ends of the chains 4 which have their upper ends connected with the transverse end frame members 2 of the float frame, as shown at 5.

Mounted upon the longitudinal horizontal frame members 1 are the sectional bearings 6, within which bearings is rotatably mounted the shaft 7 which has one end extended beyond one of the bearings 6 and the horizontal longitudinal frame member 1 upon which it is mounted, to support a pulley 8 from which power from the shaft 7 may be transmitted in any suitable and well known manner.

Mounted upon the shaft 7 between the bearings 6 is the hub 9 of the power wheel, which is preferably formed in the usual manner and keyed to the shaft 7 in any suitable and well known manner, (not shown). Secured to the hub 9 are the inwardly turned inner extremities 10 of the blades 11 which have their inner ends reversely curved, as shown at 12 and offset from their spoon shape outer working ends before being turned as shown at 10 and secured to the hub 9, as clearly illustrated in Fig. 2 of the drawing.

From the foregoing it will be readily seen that by constructing the blades 11 in this manner, the working ends of which are spoon shape and extended transversely of the float frame, the blades 11 will have a resilient action against the current forcing the blades around the shaft 7 and will be strong and durable and more capable of withstanding the strain to which the wheel of tide motors of this type are subjected. It will be further understood that the float frame is placed in the stream so that the current plays upon the concaved sides of the spoon shape or other working ends of the blades 11 thereby readily forcing the wheel to rotate and revolve the shaft 7. It will also be readily seen that this float frame will rise and lower as the tide goes in and out without interfering with the proper operation of the motor.

While the preferred embodiment of the invention has been shown and illustrated, it will be understood that minor changes in the details of construction and arrangement of parts may be made within the scope of the appended claims without departing from the spirit of the invention or sacrificing any of the advantages thereof.

What is claimed is:—

1. A device of the character described comprising a float frame, bearings upon said float frame, a shaft mounted in said bearings and extending transversely of the float frame, a wheel hub mounted on the shaft between said bearings, and blades having their inner ends turned at right angles to the outer ends thereof and reversely curved and secured to the hub.

2. A motor of the class described including a float frame, means for anchoring the float frame in a stream, a shaft mounted upon said float frame, a hub carried by said shaft within said frame, one end of the shaft being extended beyond the frame, a pulley mounted upon the extended end of the shaft, and blades having their inner ends reversely curved and secured to said hub, the outer ends of the blades being spoon shape.

3. A tide motor of the class described including a float frame comprising longitudinal and transverse frame members, a shaft extended transversely of the frame, means for mounting the shaft upon said frame, a hub secured upon said shaft within the frame, and means for anchoring said frame in a stream, said blades extending radially from said hub, the inner ends of said blades being turned and reversely curved and secured by their inner extremities to said hub, the portions of the blades adjacent the secured inner ends thereof being at substantial right angles to the outer working ends of said blades, the working ends of said blades being concavo-convex in cross section.

In testimony whereof I affix my signature in presence of two witnesses.

HENRY MONROE.

Witnesses:
CHAS. LAMME,
T. McLAUGHLIN.

Copies of this patent may be obtained for five cents each, by addressing the "Commissioner of Patents, Washington, D. C."